UNITED STATES PATENT OFFICE.

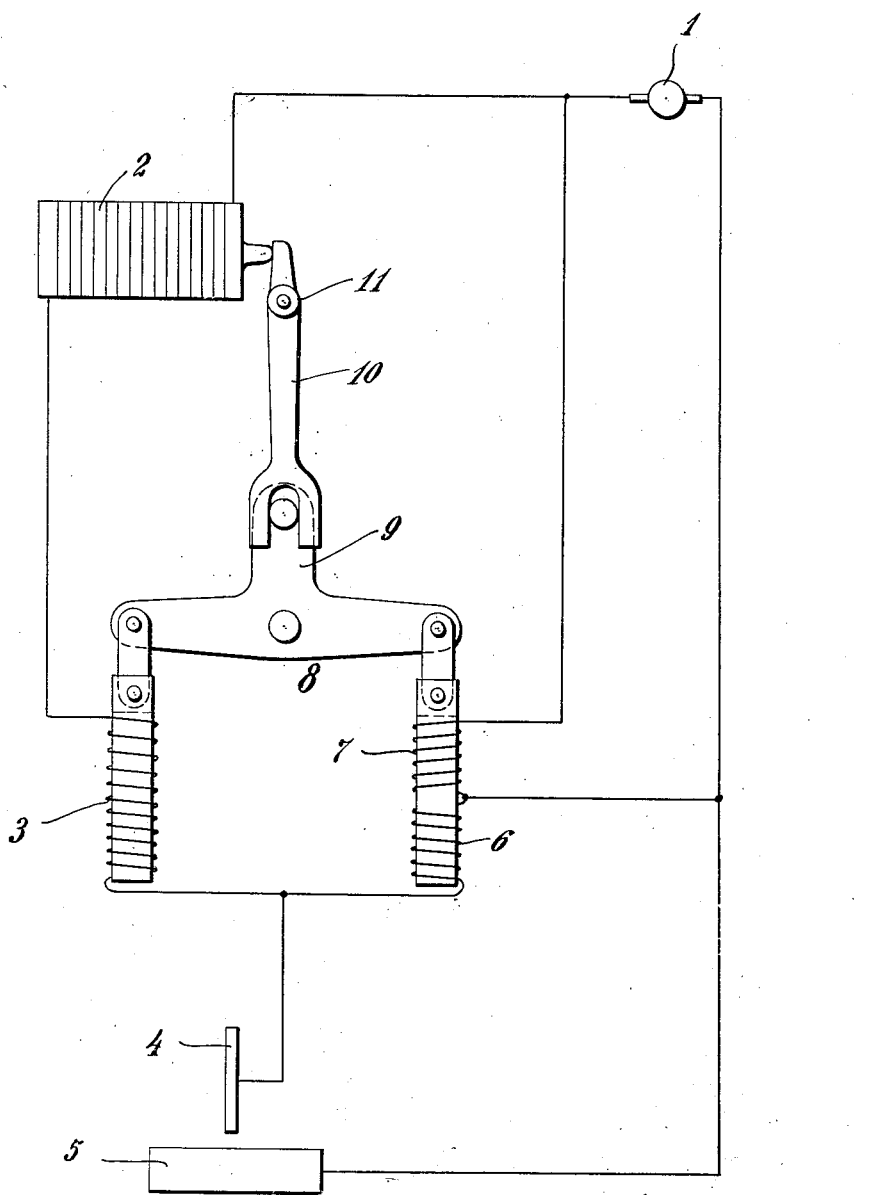

ALEXANDER CHURCHWARD, OF NEW YORK, N. Y., ASSIGNOR TO WILSON WELDER & METALS COMPANY, INC., A CORPORATION OF NEW YORK.

ELECTRICAL WELDING APPARATUS.

1,370,286.  Specification of Letters Patent.  Patented Mar. 1, 1921.

Application filed June 24, 1919. Serial No. 306,371.

*To all whom it may concern:*

Be it known that I, ALEXANDER CHURCHWARD, a citizen of the United States, residing at New York city, county of New York, State of New York, have invented a certain new and useful Improvement in Electrical Welding Apparatus, of which the following is a specification.

This invention consists in electrical welding apparatus, and is particularly applicable to arc welding, in which adaptation it is illustrated in the accompanying drawing. The object of the invention is to automatically regulate the welding current to most efficiently accommodate changes in the conditions of the welding operation, e. g., changes from contact of welding electrodes to separation thereof, and changes in the length or resistance of the welding arc.

More specifically, it is an object of the invention to automatically vary the amount of welding heat produced in proportion or approximate proportion to the electrode area over which the heating effect is dispersed, as this electrode area is varied with the length of the welding arc. That is to say, as the length of the welding arc is increased, its active anode surface spreads so that its total fusing heat is correspondingly dispersed, and hence must be increased in proportion to such anode surface in order to maintain a constant heating and fusing effect per unit area.

The drawing is a diagram representing the general idea of the invention, which may be practised in many different constructions and arrangements within its basic principles and the scope of the appended claims.

In the diagram, the welding circuit proper leads from the generator 1, through a pressure-variable resistance consisting in the carbon pile 2, and thence through the series resistance-regulating solenoid 3, and welding electrodes 4 and 5, back to the generator. A coil 6 connected in shunt with the welding electrodes, and a coil 7 connected across the current supply mains, are combined as co-acting sections of another solenoid surrounding a common core; and the cores of the respective solenoids 3 and 6, 7, are suspended from the opposite ends of a horizontal beam lever 8, whose upwardly extending arm 9 actuates the lever 10 pivoted at 11 to compress the carbon pile 2. Thus the pressure on the pile is always the difference between the compressive effort of the solenoid 6, 7, and the opposed pressure-relieving effort of the solenoid 3; so that the attraction of the solenoid 6, 7 will always tend to reduce the pile-resistance in the welding circuit, while the attraction of the series solenoid 3 will always tend to increase the pile-resistance in the welding circuit. The series solenoid 3 has a relatively low resistance, and the solenoid coils 6 and 7 have a relatively high resistance.

Before the welding electrode 4 is brought into contact with the work or anode 5 to establish the welding arc, the low-resistance series solenoid 3 and the high-resistance solenoid coil 6 are energized by current passing through them in series, thereby effecting minimum attractive effort of the series solenoid 3, and maximum energization of the shunt solenoid coil 6 in conjunction with the constant energization of its co-acting coil 7 to produce the maximum joint attractive effort of these coils. Thus the resistance pile 2 is subjected to maximum compression affording minimum resistance. At first glance it might appear that this condition of minimum resistance in the pile is most disadvantageous for making direct contact between the welding electrodes to establish the welding arc, but it is found in practice that the excessive surge of current which might be expected does not in fact occur to any objectionable degree, because it is sufficiently checked by the self-inductance of the series solenoid 3 until sufficient additional resistance is introduced into the pile by the increase in attractive effort of this solenoid and the decrease in attractive effect of the shunt solenoid coil 6 due to flow of current between the electrodes.

If the electrodes are left long enough in contact, the current in the series solenoid 3 will attain its maximum and the current in the shunt solenoid coil 6 will subside to virtual zero, so that the resultant pile-compressing moment of the lever system will be reduced to its minimum value so as to introduce maximum pile resistance into the welding circuit. This maximum pile resistance is of course determined by the preponderance of attractive effort of the constant solenoid coil 7 over the attraction of the series solenoid 3. These coils and the shunt coil 6 and their lever system and the resistance pile, may be designed and proportioned so that the current flow between the welding electrodes when thus left in contact will be the least that can flow under any condition, and just sufficient to establish the welding arc when the electrodes are separated, and so that the current flow between the electrodes will actually increase as the arc is established and gradually lengthened. That is to say, the gradual resistance-reducing effect of the shunt solenoid coil 6 in co-action with the other coils as its current is gradually increased by the increasing length and resistance of the welding arc, may be greater than this increase in arc resistance, so that the current of the welding arc will gradually increase as the arc is lengthened and the area of its heating surface extended. The said controlling parts may be so designed that this current increase will maintain approximately constant heating effect per unit of active anode surface as said surface is extended by the lengthening of the arc, and of course the regulation will operate reversely as the arc is again shortened. One important consequence is that efficient welding may be accomplished with an arc which is less constant in its length, and hence by operators possessing less skill than has generally been required to maintain a steady and efficient welding arc.

The generic idea embodied in the controlling coil 6 in shunt with the welding arc, is covered in my co-pending application, Serial No. 291,885, filed April 22, 1919, and this application is particularly addressed to the additional invention embodied in the controlling coil 7 and its co-action with the other coils.

This invention may be practised in various constructions and arrangements different from the specific adaptation which has been illustrated, and some of which modifications will be obvious to the skilled technician, while others may be devised by supplemental invention, all within the principles and intended scope of the following claims.

I claim:

1. Electrical welding apparatus comprising a welding circuit; a source of welding current therefor, and electrically controllable current-governing means therefor arranged to be governed jointly by current derived from the welding circuit and variable with the conditions therein, and current independently derived from said source.

2. Electrical welding apparatus comprising a welding circuit, a source of welding current therefor, and current - governing means therefor including a controlling coil connected with the welding circuit and a co-acting coil independently deriving current from said source.

3. Electrical welding apparatus comprising a welding circuit and a source of welding current therefor; and current governing means therefor including two co-acting coils, one in series with the weld, and the other independently deriving current from said source.

4. Electrical welding apparatus comprising a welding circuit and a source of welding current therefor; and current governing means therefor including two co-acting coils, one in shunt with the weld, and the other independently deriving current from said source.

5. Electrical welding apparatus comprising a welding circuit, a source of welding current therefor, a variable resistance in the welding circuit, and means controlling said resistance and including a coil connected with the welding circuit and a co-acting coil independently deriving current from the said source.

6. Electrical welding apparatus comprising a welding circuit including a pressure-variable resistance, a source of welding current therefor, and means for controlling the pressure on said resistance including a coil connected with the welding circuit and a co-acting coil opposed thereto in its pressure-varying effect and independently deriving current from said source.

7. Electrical welding apparatus comprising a welding circuit including a variable resistance; a source of welding current therefor; and means for controlling said resistance, including a coil in series with the weld and tending to increase said resistance, and a coil independently deriving current from said source and tending to reduce said resistance.

8. Electrical welding apparatus comprising a welding circuit including a variable resistance; a source of welding current therefor; and means for controlling said resistance, including two co-acting coils both tending to reduce said resistance, and one of them connected in shunt with the weld, and the other independently deriving current from said source.

9. Electrical welding apparatus comprising a welding circuit including a variable resistance; a source of welding current therefor; and means for controlling said resistance, including three co-acting coils, one coil connected in series with the weld and tending to increase said resistance, a second coil connected in shunt with the weld and tending to reduce said resistance, and a third coil independently deriving current from said source and also tending to reduce said resistance.

10. Electrical welding apparatus comprising a welding circuit; an electrically controlled resistance therefor arranged to be governed jointly by variable current derived therefrom and current derived independently thereof; and means for supplying said welding and independent currents.

11. Electrical welding apparatus comprising a welding circuit; resistance means therefor including a controlling coil in series with the weld and a second coil co-acting therewith; and means for supplying currents to the welding circuit and said second coil.

12. Electrical welding apparatus comprising a welding circuit; current-governing means therefor including a controlling coil in shunt with the weld and a second coil co-acting therewith; and means for supplying currents to the welding circuit and said second coil.

13. Electrical welding apparatus comprising a welding circuit including a variable resistance; means for controlling said resistance including a coil in series with the weld and tending to increase said resistance, and a second coil co-acting therewith and tending to reduce said resistance; and means for supplying currents to the welding circuit and said second coil.

14. Electrical welding apparatus comprising a welding circuit including a variable resistance; means for controlling said resistance including a coil in shunt with the weld tending to reduce said resistance, and a second coil co-acting therewith also tending to reduce said resistance; and means for supplying currents to the welding circuit and said second coil.

15. Electrical welding apparatus comprising a welding circuit including a variable resistance; means for controlling said resistance including a coil in shunt with the weld tending to reduce said resistance, a second coil co-acting therewith also tending to reduce said resistance, and a third coil co-acting with both said coils and connected in series with the weld and tending to increase said resistance; and means for supplying currents to the welding circuit and said second coil.

16. An electrical welding apparatus comprising a welding circuit, a source of welding current therefor, a pressure variable resistance for controlling the current in the welding circuit, means for automatically varying the pressure on said resistance, including a coil connected with the welding circuit and a co-acting coil opposed thereto in its pressure varying effect and independently deriving current from said source.

17. Electrical welding apparatus comprising a welding circuit; electrically controllable current-governing means included in the welding circuit and arranged to be governed jointly by variable current derived from said circuit and current derived independently thereof; and means for supplying said welding and independent currents.

18. Electrical welding apparatus comprising a welding circuit; a controlling coil in series with the weld; a second coil co-acting therewith; current-governing means in the welding circuit and controlled by said coils jointly; and means for supplying currents to the welding circuit and said second coil.

In testimony whereof, I have affixed my signature to this specification.

ALEXANDER CHURCHWARD.